United States Patent
Kang et al.

(10) Patent No.: US 10,830,900 B1
(45) Date of Patent: Nov. 10, 2020

(54) NON-TLE-BASED POINTING ACQUISITION OF INCLINED-GEOSTATIONARY SATELLITE

(71) Applicant: ThinKom Solutions, Inc., Hawthorne, CA (US)

(72) Inventors: Christopher Kang, Los Angeles, CA (US); Talat Kiani, Mission Viejo, CA (US)

(73) Assignee: ThinKom Solutions, Inc., Hawthorne, CA (US)

( * ) Notice: Subject to any disclaimer, the term of this patent is extended or adjusted under 35 U.S.C. 154(b) by 0 days.

(21) Appl. No.: 16/600,833

(22) Filed: Oct. 14, 2019

(51) Int. Cl.
| | |
|---|---|
| *G01S 19/25* | (2010.01) |
| *H04B 7/185* | (2006.01) |
| *H04B 17/318* | (2015.01) |
| *H04B 7/204* | (2006.01) |
| *G06F 16/953* | (2019.01) |

(52) U.S. Cl.
CPC .......... *G01S 19/258* (2013.01); *G06F 16/953* (2019.01); *H04B 7/18519* (2013.01); *H04B 7/18521* (2013.01); *H04B 7/2041* (2013.01); *H04B 17/318* (2015.01)

(58) Field of Classification Search
CPC .............. H04B 17/318; H04B 7/18519; H04B 7/18521; H04B 7/2041; G06F 16/953; G01S 19/258
See application file for complete search history.

(56) References Cited

U.S. PATENT DOCUMENTS

| | | | | |
|---|---|---|---|---|
| 5,592,176 A | * | 1/1997 | Vickers | ..................... G01S 3/42 342/359 |
| 6,442,385 B1 | * | 8/2002 | Marko | ............... H04B 7/18534 244/158.4 |
| 2008/0291083 A1 | * | 11/2008 | Chang | .................... H04B 7/086 342/354 |
| 2013/0328721 A1 | * | 12/2013 | Rochblatt | ............ H01Q 1/1257 342/359 |
| 2015/0158603 A1 | * | 6/2015 | Marshack | .............. H01Q 1/288 244/158.4 |
| 2016/0268677 A1 | * | 9/2016 | Lemme | ..................... H04B 7/19 |
| 2016/0336652 A1 | * | 11/2016 | Yoshida | ................... H01Q 3/08 |
| 2020/0264318 A1 | * | 8/2020 | Goodrum | ................ G01S 19/14 |

* cited by examiner

*Primary Examiner* — Devan A Sandiford
(74) *Attorney, Agent, or Firm* — Kusner & Jaffe

(57) ABSTRACT

A method for pointing an antenna at an inclined geostationary satellite includes obtaining an analemma of the inclined geostationary satellite, and determining a plurality of points that are to be searched, wherein determining the plurality of points comprises selecting points that follow a centerline of the analemma. One point of the plurality of points is selected and the antenna is pointed at the selected point. While the antenna is pointing at the selected point, the inclined geostationary satellite is queried an RF power level of a response to the query received from the inclined geostationary satellite is recorded. Another point of the plurality of points and the query/recording step is repeated for each of the plurality of points. A determination is made regarding which point of the plurality of points produced a response to the query having the highest power level. The antenna then is pointed at the point having the highest power level.

18 Claims, 4 Drawing Sheets

NON-TLE-BASED POINTING ACQUISITION OF INCLINED-GEOSTATIONARY SATELLITE

TECHNICAL FIELD

The present invention relates generally to satellites, and more particularly, to a device and method for acquiring the location of an inclined geostationary satellite.

BACKGROUND ART

Satellites in geostationary orbit (GSO) have the unique property of appearing fixed to an observer on Earth. GSO simplifies many aspects of tracking and acquisition of the satellite for the purposes of establishing communication. For example, a ground station antenna used to communicate with the satellite can be configured once, with a fixed pointing angle.

To maintain the GSO property, however, a satellite must carry out periodic station-keeping thrust maneuvers to counter orbit-disturbing effects primarily caused by the gravity of the moon and the sun. These operations slowly use up the satellite's limited on-board fuel supply.

To prolong a geostationary satellite's service life, satellite operators may opt to allow the satellite to develop an inclination whereby the satellite is allowed to drift above and below the geo-arc, and station-keeping maneuvers are limited to only those required to maintain the satellite's longitudinal slot. In doing so, however, the stationary property of the GSO is no longer maintained.

Approaches to accurately pointing at this category of non-geostationary (typically referred to as inclined-geostationary orbit) satellites range from overly complex algorithms to cumbersome look-up tables.

SUMMARY OF INVENTION

A device and method in accordance with the invention provide a practical alternative to keeping an inclined geosynchronous satellite viable within its network. More specifically, orbital dynamics of the inclined-GSO are utilized such that only a few orbital parameters are needed to efficiently identify a search path to acquire and track the satellite.

According to one aspect of the invention, a method for pointing an antenna at an inclined geostationary satellite includes: a) obtaining an analemma of the inclined geostationary satellite; b) determining a plurality of points that are to be searched, wherein determining the plurality of points comprises selecting points that follow a centerline of the analemma; c) selecting one point of the plurality of points; d) pointing the antenna at the selected point; e) while the antenna is pointing at the selected point, querying the inclined geostationary satellite and recording an RF power level of a response to the query received from the inclined geostationary satellite; f) selecting another point of the plurality of points; g) repeating steps d-f for each of the plurality of points; h) determining which point of the plurality of points produced a response to the query having the highest power level; and i) pointing the antenna at the point having the highest power level.

In one embodiment, determining the plurality of points comprises selecting the plurality of points to create a linear grid of uniform spacing.

In one embodiment, selecting the plurality of points comprises basing the spacing of the plurality of points on a beam width of the antenna, wherein each point of the plurality of points is spaced apart from an immediately adjacent point of the plurality of points by no more than the beam width of the antenna.

In one embodiment, determining the plurality of points comprises compensating for warping of the analemma due to spherical projection.

In one embodiment, compensating for spherical projection includes performing coordinate transformations.

In one embodiment, obtaining the analemma includes determining the analemma based on a nominal longitude of the inclined geostationary satellite and a maximum orbit inclination of the inclined geostationary satellite.

In one embodiment, when two points exhibit the same power level, pointing the antenna includes pointing the antenna at a midpoint between the two points with the highest power level.

In one embodiment, the method includes performing the method without using two-line element (TLE) data.

According to another aspect of the invention. a system for locating an inclined geostationary satellite includes: an antenna; a steering device coupled to the antenna, the motive device operative to change a pointing direction of the antenna; and a controller communicatively coupled to the antenna and the motive device, the controller including a processor and memory, and instructions stored in memory and executable by the processor, wherein when executed the instructions cause the processor to a) obtain an analemma of the inclined geostationary satellite; b) determine a plurality of points that are to be searched, wherein the plurality of points follow a centerline of the analemma; c) select one point of the plurality of points; d) command the motive device to point the antenna at the selected point; e) while the antenna is pointed at the selected point, transmit via the antenna a query to the inclined geostationary satellite and record an RF power level of a response to the query transmitted by the inclined geostationary satellite and received by the antenna; f) select another point of the plurality of points; g) repeat steps c-f for each of the plurality of points; h) determine which point of the plurality of points produced a response to the query having the highest power level; and i) command the motive device to point the antenna at the point having the highest power level.

In one embodiment, further including performing received signal strength indication (RSSI) to optimize pointing of the antenna.

In one embodiment, the instructions that cause the processor to determine the plurality of points further cause the processor to select the plurality of points to create a linear grid of uniform spacing.

In one embodiment, the instructions that cause the processor to select the plurality of points further cause the processor to base the spacing of the plurality of points on a beam width of the antenna, wherein each point of the plurality of points is spaced apart from an immediately adjacent point of the plurality of points by no more than the beam width of the antenna.

In one embodiment, the instructions that cause the processor to determine the plurality of points include instructions that cause the processor to compensate for warping of the analemma due to spherical projection.

In one embodiment, the instructions that cause the processor to compensate for spherical projection includes instructions that cause the processor to perform coordinate transformations.

In one embodiment, the instructions that cause the processor to obtain the analemma includes instructions that cause the processor to determine the analemma based on a nominal longitude of the inclined geostationary satellite and a maximum orbit inclination of the inclined geostationary satellite.

In one embodiment, when two points exhibit the same power level, the instructions that command the motive device to point the antenna includes instructions that command the motive device to point the antenna at a midpoint between the two points with the highest power level.

In one embodiment, the instructions executed by the processor do not employ two-line element (TLE) data.

According to another aspect of the invention, a method for pointing an antenna at an inclined geostationary satellite includes: obtaining an analemma of the inclined geostationary satellite; transmitting a query to the inclined geostationary satellite while the antenna is pointed at each of a plurality of different locations that follow a centerline of the analemma; for each query, recording a power level of a response from the inclined geostationary satellite; and pointing the antenna at the location that produces the highest power level.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1:
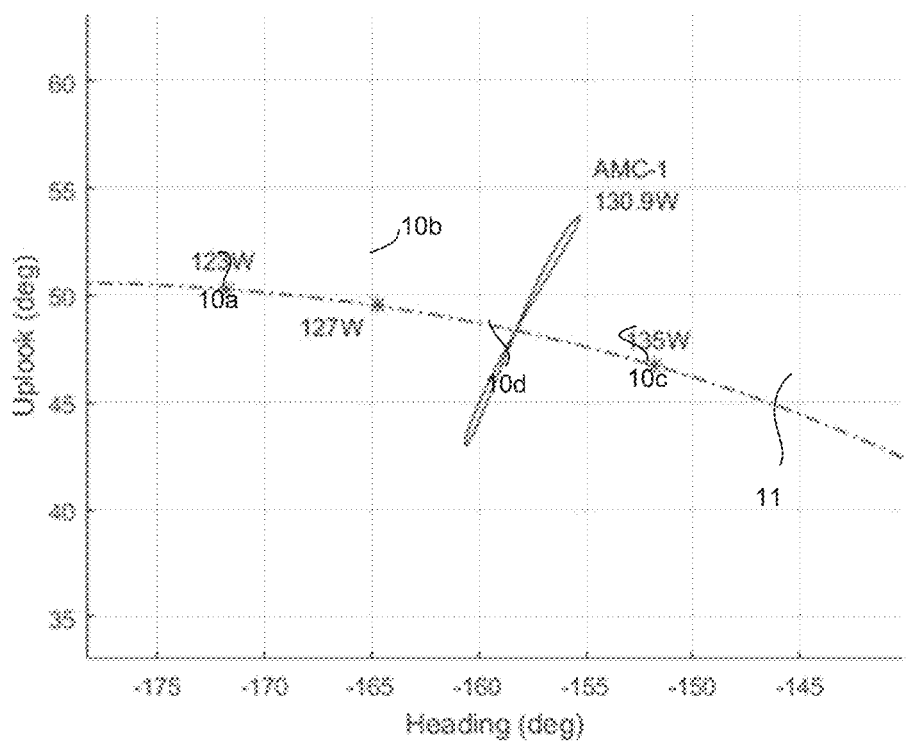
FIG. 1 is a plot showing how three representative geostationary satellites and one inclined-orbit satellite would appear to an observer on the Earth over the period of a sidereal day.

Embodiments of the present invention will now be described with reference to the drawings, wherein like reference numerals are used to refer to like elements throughout. It will be understood that the figures are not necessarily to scale.

A geostationary satellite must perform station-keeping orbital maneuvers to remain in its assigned orbital position. From a location on Earth, this results in the satellite appearing to be stationary in the sky over a sidereal day. Near the end of the satellite's service life, the restriction on the allowable latitude deviation (effectively its orbit inclination) is relaxed. As a result, from the same location on Earth, tracking an inclined-orbit satellite over its orbital period produces an apparent satellite motion in the approximate form of a figure-8, or analemma. FIG. 1 illustrates how three representative geostationary satellites 10a, 10b, 10c and one inclined-orbit satellite 10d would appear to an observer on Earth over the period a sidereal day.

Since fixed-pointing ground station antennas are no longer able to reliably point to such inclined orbit satellites owing to the satellite's apparent movement in the sky over time, given the smaller population of viable ground station antennas capable of maintaining a communications link with them (i.e., antennas with steerable beams) satellite operators are usually forced to reduce the rates they charge to use such satellites. For ground station antennas that have steerable beams, use of inclined satellites can result in significant cost savings, as long as the systems are able to acquire and track these slowly moving inclined satellites.

From an Earth location co-longitudinal with the inclined geostationary satellite 10d, the analemma will appear to be some variant of a vertically-oriented figure-8 in form. No two analemmas will be identical as other orbital parameters influence the properties. As the Earth-observer moves to any general location on the surface of the Earth (within view of the satellite), the figure-8 will appear to distort. This is simply due to skew angle at which the Earth-observer is viewing the satellite and the geometric projection of this shape onto the surface of a sphere. With a complex model this trajectory can be recreated.

In pointing an antenna at a satellite, one must know the position of the satellite in the sky. The narrower the antenna's beam, the more precise the satellite's position must be known. A common method of determining a satellite's present position is to process and propagate the satellite's Two-Line Element (TLE) data. TLE data is a set of orbital parameters formatted for use specifically with Simplified General Perturbation (SGP) models to predict orbital trajectories. The orbital parameters are produced and maintained by NORAD and NASA. Processing and propagating a satellite's TLE data, however, is a computationally intensive process that requires both algorithmic and administrative solutions to maintain a sufficient level of ground antenna pointing accuracy.

Due to the various simplifications and non-linearities associated with the SGP set of models, the TLE data only accurately predict orbital trajectories for a limited time horizon. (This allowable time horizon being defined differently for each specific application's needs on accuracy). As such, NORAD updates and publishes these TLE data sets daily. TLE/SGP is a very popular model-based method and is considered by many as an industry standard. It is noted, however, that the TLE/SGP model is only one particular model set describing orbital trajectories, and those with other needs/limitations can and do generate their own models.

There are two common approaches to address the problem concerning the limited time horizon of the inclined geostationary satellite. A first is a table-based approach in which the antenna system points to the satellite and records its position through its 24-hour period (an inclined-geostationary satellite will repeat its trajectory in the sky over its orbital period of one sidereal day). The positional accuracy of this method is proportional to the resolution of this data table. As the resolution increases, the antenna system can perform more frequency updates to the pointing position.

A second approach to address the limited time horizon problem of the inclined geostationary satellite utilizes model-based (TLE data or another satellite parameter standard) approach. Under this approach, the satellite position is calculated using a mathematical model. A priori updated TLE information must be available as well as an accurate measure of UTC time (Coordinated Universal Time). The Coordinated Universal Time is simply the international standard for time-keeping and coordination. It is especially critical to any model propagation method (like TLE/SGP) since numerical propagation is relative to some agreed upon starting time as well as the agreed upon time it is "now". Providing access to this coordinated clock is a necessary and non-trivial challenge.

The table-based approach may be the simplest to implement, but still has many challenges. Before the system can use the look-up table to find the coordinates to point to, the table must be populated by the correct values. This implies that some other method of determining satellite position must be first used before the table method can be used. Once the table is filled, there must be some mechanism to correct the small variances in position as the satellite will not be following the 'table values' precisely. Storing the look-up table in memory is also not a negligible aspect of implementation. Storage for several satellites, numerical precision of the values stored, corruption of data, are some of the implementation challenges associated with a table-based approach.

On the opposite side of complexity, the model-based approach can determine the present position of the satellite in its orbital period. Accuracy of the predicted position is limited by accuracy in each of the parameters, complexity of the model, and numerical precision in the processor, among others. Processing and propagating the TLE data is a computationally resource intensive task, especially to perform in real-time on a microprocessor as opposed to offline (or ahead of time) by a larger processor without the constraints of real-time system operations. The parameters of the TLE data must also be updated frequently, without which the prediction error in position will grow non-linearly, and depending on the precision required from the antenna system, the propagated model may fall out of acceptable range in a matter of days. Upkeep of this TLE data (or any other form of math model) adds another source of complexity to implementation. In addition, the system must have access to UTC time.

In accordance with the present invention, a system and method are provided that leverage the bounded dynamics of a geostationary satellite with non-negligible inclination as a means to search for and acquire the satellite's location anywhere along its trajectory. Moreover, such search can be performed in a timely fashion using a minimum number of its identifying properties, without the need for TLE data processing and upkeep.

Figure 2:
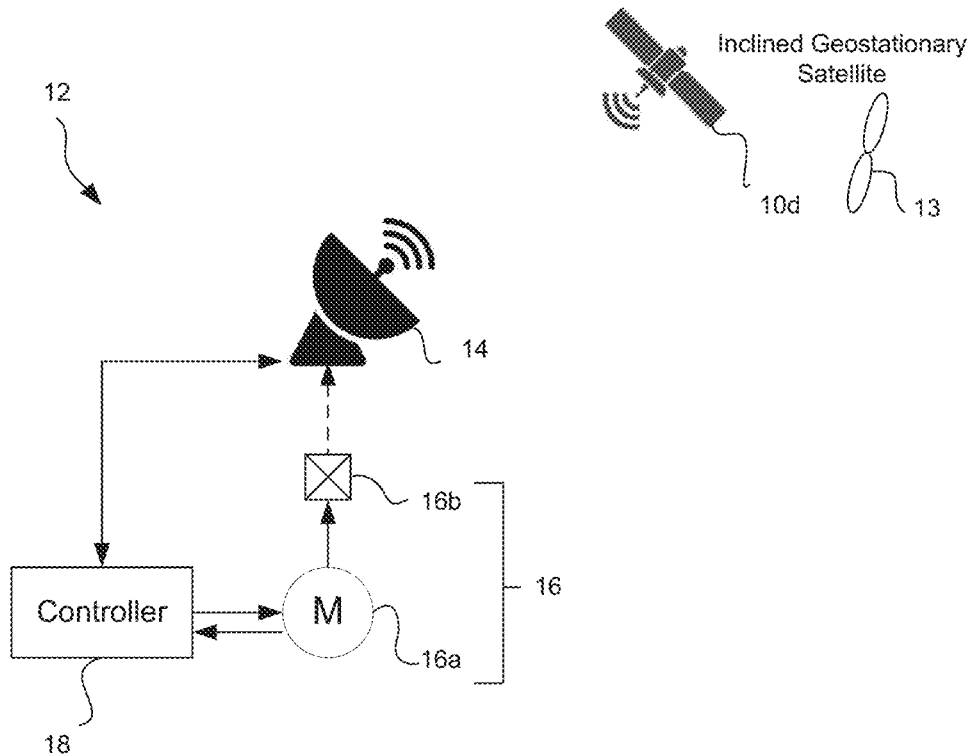
FIG. 2 is a simple schematic diagram illustrating an exemplary system for acquiring a position of an inclined geostationary satellite in accordance with the invention.

Referring to FIG. 2, illustrated is an exemplary system 12 for locating and pointing an antenna at an inclined geostationary satellite 10d. As shown in FIG. 2, the "inclined" geostationary satellite 10d is technically no longer stationary, and instead has an analemma 13 that, from a viewpoint on Earth, appears as a figure-8 pattern over a period of twenty-four hours. Thus, the exact location of the satellite 10d is not known without additional information. As will be described in more detail below, in accordance with the invention the position of the satellite 10d is precisely located using minimal computational power and without the use of TLE data or other complex math models.

With continued reference to FIG. 2, the system 12 includes an antenna 14 for communicating with the satellite 10d. The antenna 14 may be any conventional antenna utilized for satellite communications, such as, for example, a reflector antenna, a horn antenna, phased array antenna, and the like. A steering device 16 is operatively coupled to the antenna 14 for pointing the antenna 14 at various coordinates. The steering device 16, for example, may be in the form of an electromechanical actuator that includes a motor 16a and corresponding drive train 16b that can change one or more of the azimuth, elevation and polarization angles of the antenna 14. The steering device 16 may also be in the form of phase shifters, metamaterials, or other devices that enable pointing of a phased array without the need for electromechanical actuation. A controller 18 is communicatively coupled to the antenna 14 and the steering device 16. The controller 18 provides commands to the steering device 16 to point the antenna 14 at specified coordinates, receives position data indicating the current pointing direction of the antenna 14, and provides data to and receives data from the antenna 14.

In accordance with the invention, an acquisition command triggers the acquisition of the inclined geostationary satellite's location. More particularly, a search grid is determined that includes a plurality of discrete points that are uniformly spaced apart, the search grid based on known constraints of the system. The system constraints include, for example, the longitudinal coordinate in which the satellite 10d resides (the longitudinal coordinate is known and does not significantly vary over the satellite's useful life), the beam width of the antenna 14 that is searching for the satellite 10d (the beam width is also known), and the analemma 13 of the satellite 10d of interest. The analemma 13 of the satellite 10d for its full orbital period can be determined, for example, using the minimum critical orbital parameters for the satellite of interest (e.g., the longitudinal coordinate and the maximum orbit inclination). For example, the analemma can be modeled using a parametric pair of equations that require only the longitudinal coordinate and maximum orbit inclination of the satellite. Other models with different precision, accuracy, and/or phasing (time dependent) requirements exist, but add unneeded complexity. In the idealized figure-8 form, the satellite's analemma 13 is symmetric about the Clarke belt 11.

In addition to the satellite parameters referenced above, parameters of the interrogating earth terminal, such as the terminal longitude, latitude, altitude, roll, pitch and heading, may be needed in order to point the antenna in the correct location. These parameters are known or can be readily determined using conventional means.

Figure 3:
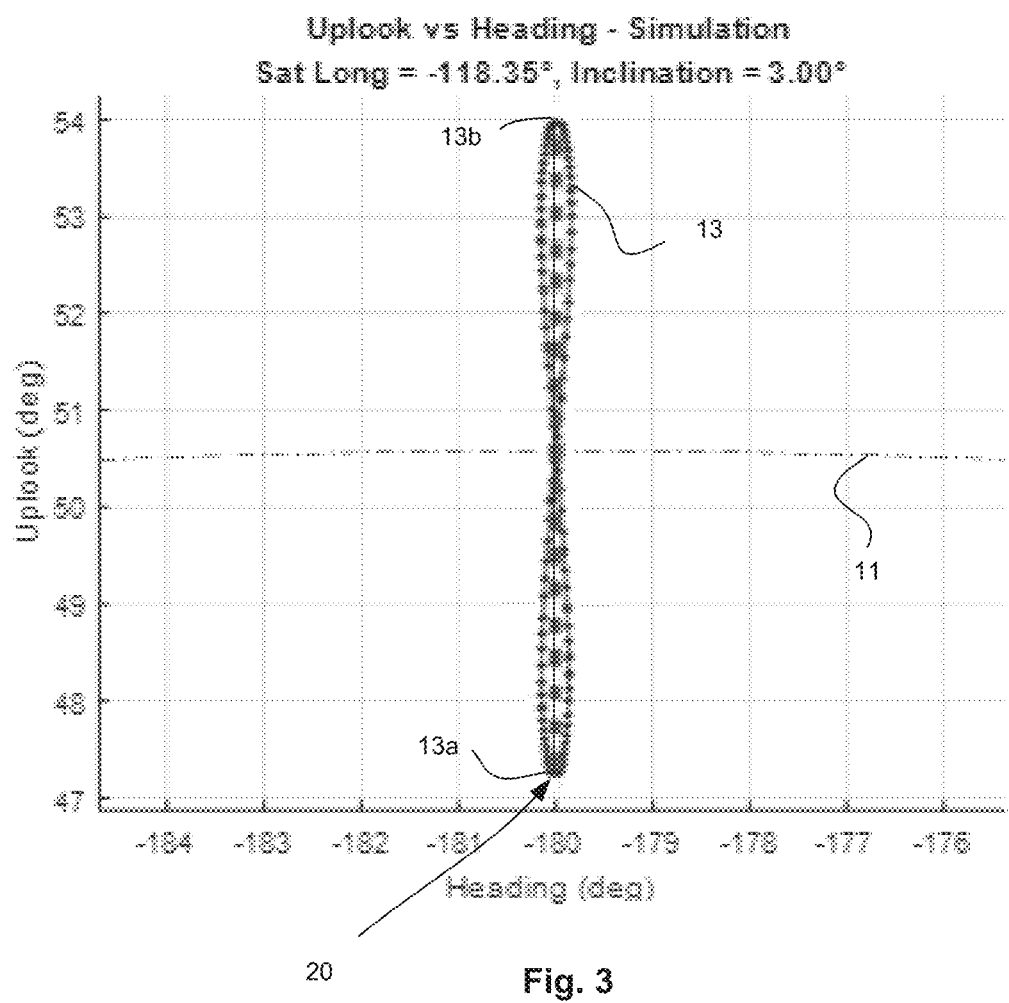
FIG. 3 illustrates an exemplary search grid determined in accordance with the invention, the search grid following a centerline of the satellite's analemma.

The search grid can be determined, for example, by following a centerline 20 of the analemma 13 that extends from one end 13a of the analemma to the other end 13b, as can be best seen in FIG. 3. From a general location on Earth, this centerline path will not necessarily resemble a straight line perpendicular to the Clarke belt 11. For pointing purposes, warping due to the spherical projection and skew angle should be taken into account.

The antenna 14 then is moved to each point on the search grid and a scan is performed for the satellite of interest. If a response to the scan is received, the power level of the RF response signal is recorded for that point. The power level of the received signal can be determined using conventional methods known to the person skilled in the art. The coordinates for the point(s) on the search grid corresponding to peak RF power are identified and the antenna 14 is moved to the location corresponding to such peak power, which corresponds to the location of the inclined geostationary satellite 10d. Thus, the acquisition process of the inclined geostationary satellite does not require computationally expensive propagation routine.

As part of an integrated system, a modem or other system controller can pass the relevant satellite parameters (satellite nominal longitude and max inclination angle) to the controller 18. Some or all subsequent calculations and acquisition commands in accordance with the method can be performed on the controller 18.

The method in accordance with the invention is advantageous in that it can acquire the present position of the inclined satellite quickly (on the order of a few seconds) with a minimum number of satellite-identifying parameters. An expansive look-up table, complex calculations/model propagation, and knowledge of UTC time are not required. In other words, the complexity of predicting the instantaneous position of an inclined satellite 10d can be greatly reduced. More particularly, in understanding that the analemma is bounded by physics and station-keeping regulations, the proposed method achieves the desired acquisition in a more straightforward and efficient method using the Earth-station location and the satellite's nominal longitude and maximum orbit inclination. Moreover, the method in accordance with the invention enables vehicle-based in-flight entertainment/connectivity companies to expand their satellite fleet to also include lower cost inclined geosynchronous satellites.

Figure 4:
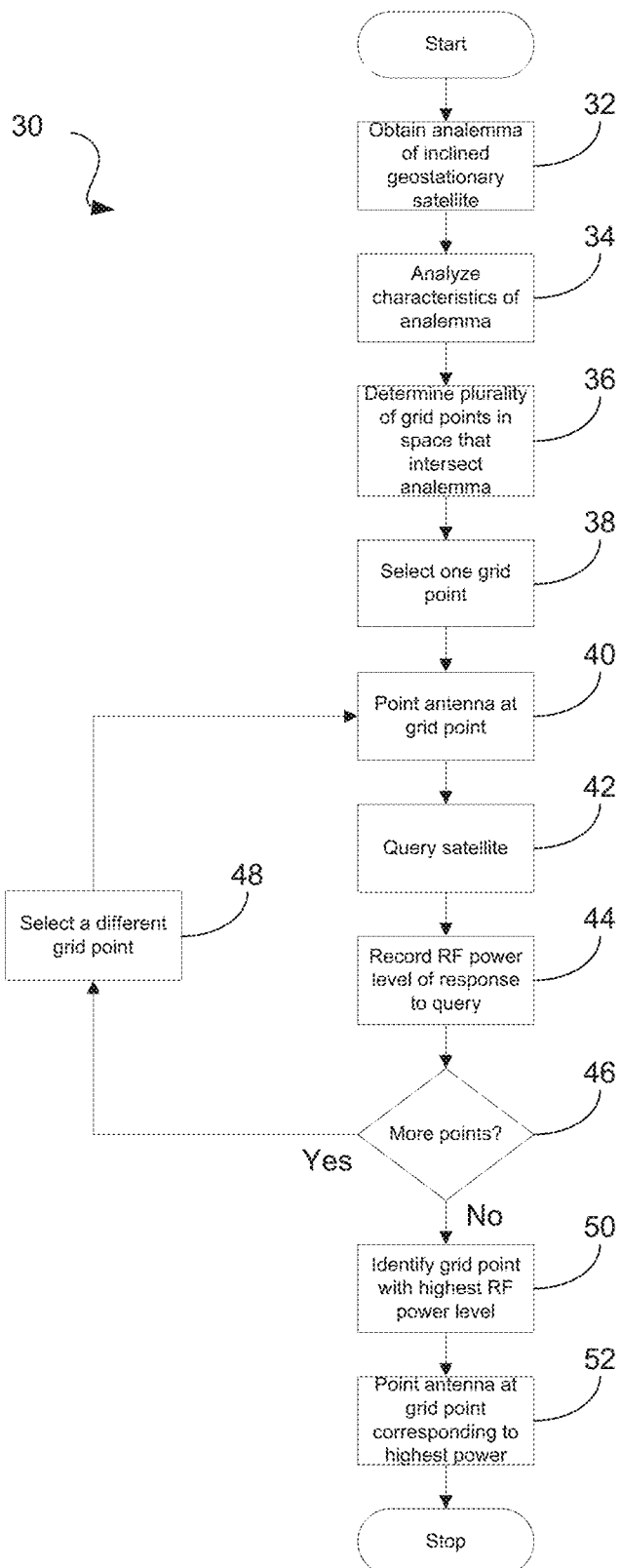
FIG. 4 is a flow chart illustrating steps of an exemplary method for acquiring a location of an inclined geostationary satellite in accordance with the invention.

Referring now to FIG. 4, illustrated is a flow chart depicting steps of an exemplary method of acquiring a location of an inclined geostationary satellite in accordance with the present invention. Variations to the illustrated method is possible and, therefore, the illustrated embodiment should not be considered the only manner of carrying out the techniques that are disclosed herein. Also, while FIG. 4 shows a specific order of executing functional logic blocks, the order of executing the blocks may be changed relative to the order shown and/or may be implemented in an object-oriented manner or a state-oriented manner. In addition, two or more blocks shown in succession may be executed concurrently or with partial concurrence. Certain blocks also may be omitted. The exemplary method may be carried out by executing code stored by an electronic device, for example. The code may be embodied as a set of logical instructions that may be executed by a processor. Therefore, the methods may be embodied as software in the form of a computer program that is stored on a computer readable medium, such as a memory.

The method according to FIG. 4 can be initiated upon an acquisition command being issued. The acquisition command may be issued by any device that seeks to locate the satellite of interest. Beginning at step 32, the controller 18 obtains the analemma 13 of the inclined geostationary satellite. In one embodiment, the analemma 13 of the inclined geostationary satellite 10d may be determined in advance and stored in memory of the controller 18. The controller 18 then can simply retrieve the analemma 13 from memory upon receiving an acquisition command. In another embodiment, the analemma 13 of the inclined geostationary satellite 10d may be determined in real time upon receiving the acquisition command. In obtaining the analemma 13, the controller 18 may use the minimum critical orbital parameters for the satellite 10d, e.g., based on a nominal longitude of the inclined geostationary satellite 10d and a maximum orbit inclination of the inclined geostationary satellite 10, the analemma 13 can be inferred. For example, the analemma for inclined geo-stationary satellites can be represented by a model which is simplified by the orbital properties of these specific satellites. First, the orbital inclination, which is known by the satellite operator, can be used to determine the "height" of the analemma. The satellite's longitude is also used to know what part of the sky the analemma must be superimposed on, in relation to the Earth observer's position. Lastly, the width of the analemma is bounded by physics, and thus forms a parametric set of equations that describes the X-Y coordinates of the analemma over the sidereal day, however this invention obviates the need for using the width of the analemma in acquiring the desired inclined GEO satellite.

Next at step 32, the analemma 13 is analyzed to determine its characteristics. In this regard, the characteristics may include a centerline of the analemma 13 and/or warping in the analemma 13 due to spherical projection. Warping may be detected, for example, when the analemma 13 does not exhibit a symmetrical pattern with respect to the Clarke belt 13. If warping is present, it may be compensated for by performing coordinate transformations.

Figure 5A:
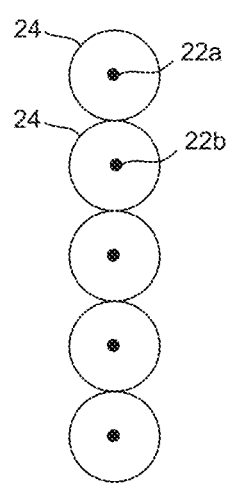
FIGS. 5A and 5B illustrate a distance between adjacent points of a search grid based on a beam width of the antenna in accordance with the invention.
Figure 5B:
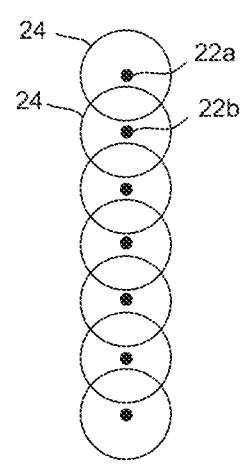

Next at step 36 a search grid is constructed, the search grid including a plurality of discrete points defining a line 20 that intersects the analemma 13. Preferably, the line 20 defined by the plurality of discrete points bisects the analemma 13 along a longitudinal axis of the analemma 13 (e.g., along a centerline of the analemma). In constructing the search grid, the beam width of the antenna 14 should be taken into account such that there are no dead zones in the scanned space. More specifically, the spacing of a plurality of points that form the grid can be based on the beam width of the antenna 14 such that each point is spaced apart from an immediately adjacent point by no more than the beam width of the antenna. In one embodiment, illustrated in FIG. 5A, the spacing of points 22 is selected such that when the antenna 14 is pointed at a first point 22a and then pointed at an immediately adjacent point 22b, an outer scan region of the antenna beam width 24 for the first point 22a and an outer scan region of the antenna beam width 24 for the second point 22b are tangent to each other. In another embodiment, illustrated in FIG. 5B, the spacing of points 22 is selected such that when the antenna 14 is pointed at a first point 22a and then pointed at an immediately adjacent second point 22b, a scan region of the beams corresponding to each point at last partially overlap with each other.

Moving to step 36, the controller 18 selects one point 22 of the grid of points, and at step 40 the controller 18 commands the steering device 16 to point the antenna 14 at the selected point 22. At step 42 a scan is performed while the antenna 14 is pointed at the selected point in space. For example, the controller 18 may command the antenna 14 to transmit a query to the satellite 10d and then listen for a response from the satellite 10d. If a response is received, the controller 18 records a power level of the RF signal response. In the case where a response is not received, the RF power level may be recorded as zero. Next at step 46 the controller 18 determines if every point 22 on the grid has been scanned. If there are more points to scan, the method moves to step 48 where a different point 22 is selected that has not yet been scanned and then the method repeats steps 40-46 until each point 22 of the grid has been scanned.

Moving back to step 46, if all points have been scanned, then the method moves to step 50 where it is determined which point of the plurality of points produced a response to the query having the highest power level. The point 22 associated with the highest power level can be identified, for example, by comparing the power level associated with each point to determine which point is associated with the highest power level. In the event that two points are each associated with a response that exhibits the same power level, a midpoint between the two points can be identified as the location of the satellite 10d. Once the point corresponding to the highest power level is identified, the controller 18 then commands the steering device 16 to point the antenna 14 at the identified point 22 (or location between points), as indicated at step 52.

Due to the fact that a line of points is used to approximately find the current location of the satellite (which is constantly moving along the analemma), the point on the grid with the highest power level may not be the "exact" location of the satellite. To further optimize the location at which the antenna is pointed, RSSI may be performed on the collected data to refine the determined location of the satellite and maintain accurate tracking once found.

Accordingly, the device and method in accordance with the invention can quickly identify the location of an inclined geostationary satellite without requiring significant computational power and without using complex mathematical models, such as TLE data sets.

Figure 6:
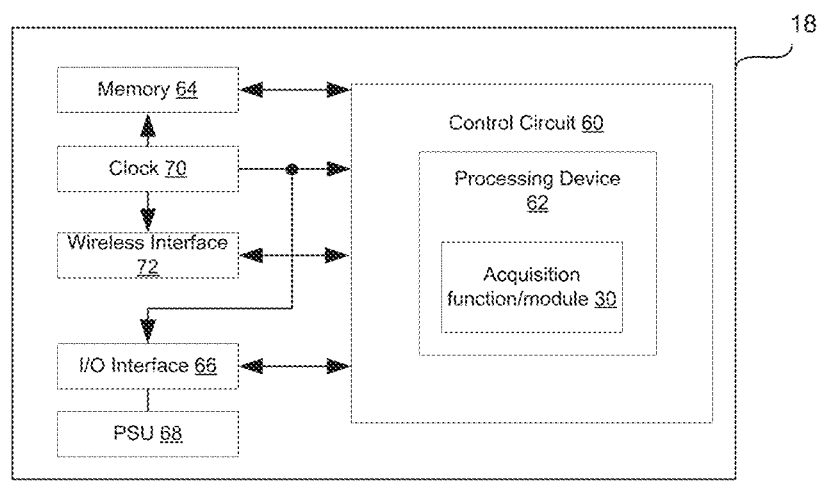
FIG. 6 is a block diagram of an exemplary controller that can be used to carry out the method in accordance with the invention.

The above-described method 30 (referred to as an acquisition function/module) may be performed by the controller 18, an example of which is illustrated in FIG. 6. The controller 18 may be any type of electronic device, examples of which include one or more integrated circuits, discrete circuits, ASICs, processors, or combination thereof. The controller 18 includes the acquisition function/module configured to carry out the acquisition method 30 described herein.

The controller 18 may include a primary control circuit 60 that is configured to carry out overall control of the functions and operations of the system. The control circuit 60 may include a processing device 62, such as a central processing unit (CPU), microcontroller or microprocessor. The processing device 62 executes code stored in a memory (not shown) within the control circuit 60 and/or in a separate memory, such as the memory 64, in order to carry out operation of the controller 18. For instance, the processing device 62 may execute code that implements the acquisition function 30. The memory 64 may be, for example, one or more of a buffer, a flash memory, a hard drive, a removable media, a volatile memory, a non-volatile memory, a random access memory (RAM), or other suitable device. In a typical arrangement, the memory 64 may include a non-volatile memory for long term data storage and a volatile memory that functions as system memory for the control circuit 60. The memory 64 may exchange data with the control circuit 60 over a data bus. Accompanying control lines and an address bus between the memory 64 and the control circuit 60 also may be present.

The controller 18 may further include one or more input/output (I/O) interface(s) 66. The I/O interface(s) 66 may be in the form of typical I/O interfaces and may include one or more electrical connectors. The I/O interface(s) 66 may form one or more data ports for connecting the controller 18 to another device (e.g., a computer-controlled device) or an accessory via a cable. The I/O interface(s) 66 may also include one or more of analog input/output ports for receiving analog data from or providing analog data to other devices, such as the steering device 16. The I/O interface(s) 66 may further include one or more digital input/output for controlling operation of the steering device 16 and/or antenna 14 and for receiving status data therefrom. Further, operating power may be received over the I/O interface(s) 66 from power supply unit (PSU) 68 within the controller 18.

The controller 18 also may include various other components. For instance, a system clock 70 may clock components such as the control circuit 60 and the memory 64. A local wireless interface 72, such as an infrared transceiver and/or an RF transceiver may be used to establish communication with a nearby device, such as a radio terminal, a computer or other device.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A method for pointing an antenna at an inclined geostationary satellite, comprising:
   a) obtaining an analemma of the inclined geostationary satellite;
   b) determining a plurality of points that are to be searched, wherein determining the plurality of points comprises selecting points that follow a centerline of the analemma;
   c) selecting one point of the plurality of points;
   d) pointing the antenna at the selected point;
   e) while the antenna is pointing at the selected point, querying the inclined geostationary satellite and recording an RF power level of a response to the query received from the inclined geostationary satellite;
   f) selecting another point of the plurality of points;
   g) repeating steps d-f for each of the plurality of points;
   h) determining which point of the plurality of points produced a response to the query having the highest power level; and
   i) pointing the antenna at the point having the highest power level.

2. The method according to claim 1, wherein determining the plurality of points comprises selecting the plurality of points to create a linear grid of uniform spacing.

3. The method according to claim 2, wherein selecting the plurality of points comprises basing the spacing of the plurality of points on a beam width of the antenna, wherein each point of the plurality of points is spaced apart from an immediately adjacent point of the plurality of points by no more than the beam width of the antenna.

4. The method according to claim 1, wherein determining the plurality of points comprises compensating for warping of the analemma due to spherical projection.

5. The method according to claim 4, wherein compensating for spherical projection includes performing coordinate transformations.

6. The method according to claim 1, wherein obtaining the analemma includes determining the analemma based on a nominal longitude of the inclined geostationary satellite and a maximum orbit inclination of the inclined geostationary satellite.

7. The method according to claim 1, wherein when two points exhibit the same power level, pointing the antenna includes pointing the antenna at a midpoint between the two points with the highest power level.

8. The method according to claim 1, further comprising performing the method without using two-line element (TLE) data.

9. A system for locating an inclined geostationary satellite, comprising:
- an antenna;
- a steering device coupled to the antenna, the motive device operative to change a pointing direction of the antenna; and
- a controller communicatively coupled to the antenna and the motive device, the controller including a processor and memory, and instructions stored in memory and executable by the processor, wherein when executed the instructions cause the processor to
  a) obtain an analemma of the inclined geostationary satellite;
  b) determine a plurality of points that are to be searched, wherein the plurality of points follow a centerline of the analemma;
  c) select one point of the plurality of points;
  d) command the motive device to point the antenna at the selected point;
  e) while the antenna is pointed at the selected point, transmit via the antenna a query to the inclined geostationary satellite and record an RF power level of a response to the query transmitted by the inclined geostationary satellite and received by the antenna;
  f) select another point of the plurality of points;
  g) repeat steps c-f for each of the plurality of points;
  h) determine which point of the plurality of points produced a response to the query having the highest power level; and
  i) command the motive device to point the antenna at the point having the highest power level.

10. The system according to claim 9, further comprising performing received signal strength indication (RSSI) to optimize pointing of the antenna.

11. The system according to claim 9, wherein the instructions that cause the processor to determine the plurality of points further cause the processor to select the plurality of points to create a linear grid of uniform spacing.

12. The system according to claim 11, wherein the instructions that cause the processor to select the plurality of points further cause the processor to base the spacing of the plurality of points on a beam width of the antenna, wherein each point of the plurality of points is spaced apart from an immediately adjacent point of the plurality of points by no more than the beam width of the antenna.

13. The system according to claim 9, wherein the instructions that cause the processor to determine the plurality of points include instructions that cause the processor to compensate for warping of the analemma due to spherical projection.

14. The system according to claim 13, wherein the instructions that cause the processor to compensate for spherical projection includes instructions that cause the processor to perform coordinate transformations.

15. The system according to claim 9, wherein the instructions that cause the processor to obtain the analemma includes instructions that cause the processor to determine the analemma based on a nominal longitude of the inclined geostationary satellite and a maximum orbit inclination of the inclined geostationary satellite.

16. The system according to claim 9, wherein when two points exhibit the same power level, the instructions that command the motive device to point the antenna includes instructions that command the motive device to point the antenna at a midpoint between the two points with the highest power level.

17. The system according to claim 9, wherein the instructions executed by the processor do not employ two-line element (TLE) data.

18. A method for pointing an antenna at an inclined geostationary satellite, comprising:
- obtaining an analemma of the inclined geostationary satellite;
- transmitting a query to the inclined geostationary satellite while the antenna is pointed at each of a plurality of different locations that follow a centerline of the analemma;
- for each query, recording a power level of a response from the inclined geostationary satellite; and
- pointing the antenna at the location that produces the highest power level.

* * * * *

UNITED STATES PATENT AND TRADEMARK OFFICE
CERTIFICATE OF CORRECTION

| | | |
|---|---|---|
| PATENT NO. | : 10,830,900 B1 | |
| APPLICATION NO. | : 16/600833 | |
| DATED | : November 10, 2020 | |
| INVENTOR(S) | : Christopher Kang and Talat Kiani | |

It is certified that error appears in the above-identified patent and that said Letters Patent is hereby corrected as shown below:

On the Title Page

The Title Item (54) should be corrected to read as follows:
"NON-TLE-BASED POINTING ACQUISITION OF INCLINED-GEOSYNCHRONOUS SATELLITE".

Item (57) should be corrected to read as follows:
"A method for pointing an antenna at an inclined geosynchronous satellite includes obtaining an analemma of the inclined geosynchronous satellite, and determining a plurality of points that are to be searched, wherein determining the plurality of points comprises selecting points that follow a centerline of the analemma. One point of the plurality of points is selected and the antenna is pointed at the selected point. While the antenna is pointing at the selected point, the inclined geosynchronous satellite is queried an RF power level of a response to the query received from the inclined geosynchronous satellite is recorded. Another point of the plurality of points and the query/recording step is repeated for each of the plurality of points. A determination is made regarding which point of the plurality of points produced a response to the query having the highest power level. The antenna then is pointed at the point having the highest power level.".

In the Specification

1) Column 1, Line 2 – the title wording "INCLINED-GEOSTATIONARY" should read "INCLINED-GEOSYNCHRONOUS".

2) Column 1, Line 9 – the wording "inclined geostationary satellite" should read "inclined geosynchronous satellite".

3) Column 1, Line 33 – the wording "inclined-geostationary orbit" should read "inclined geosynchronous orbit".

4) Column 1, Line 42 – the wording "inclined-GSO" should read "inclined-geosynchronous orbit".

Signed and Sealed this
Twenty-fourth Day of May, 2022

Katherine Kelly Vidal
*Director of the United States Patent and Trademark Office*

CERTIFICATE OF CORRECTION (continued)
U.S. Pat. No. 10,830,900 B1

5) Column 1, Line 47 – the wording "inclined geostationary satellite" should read "inclined geosynchronous satellite".

6) Column 1, Line 48 – the wording "inclined geostationary satellite" should read "inclined geosynchronous satellite".

7) Column 1, Line 55 – the wording "inclined geostationary satellite" should read "inclined geosynchronous satellite".

8) Column 1, Line 56 – the wording "inclined geostationary satellite" should read "inclined geosynchronous satellite".

9) Column 2, Line 12 – the wording "inclined geostationary satellite" should read "inclined geosynchronous satellite".

10) Column 2, Line 13 – the wording "inclined geostationary satellite" should read "inclined geosynchronous satellite".

11) Column 2, Line 21 – the wording "inclined geostationary satellite" should read "inclined geosynchronous satellite".

12) Column 2, Line 29 – the wording "inclined geostationary satellite" should read "inclined geosynchronous satellite".

13) Column 2, Line 35 – the wording "inclined geostationary satellite" should read "inclined geosynchronous satellite".

14) Column 2, Line 37 – the wording "inclined geostationary satellite" should read "inclined geosynchronous satellite".

15) Column 3, Line 2 – the wording "inclined geostationary satellite" should read "inclined geosynchronous satellite".

16) Column 3, Line 3 – the wording "inclined geostationary satellite" should read "inclined geosynchronous satellite".

17) Column 3, Line 13 – the wording "inclined geostationary satellite" should read "inclined geosynchronous satellite".

18) Column 3, Line 14 – the wording "inclined geostationary satellite" should read "inclined geosynchronous satellite".

19) Column 3, Line 15 – the wording "inclined geostationary satellite" should read "inclined geosynchronous satellite".

20) Column 3, Line 19 – the wording "inclined geostationary satellite" should read "inclined geosynchronous satellite".

21) Column 3, Line 39 – the wording "inclined-orbit" should read "inclined geosynchronous".

22) Column 3, Line 43 – the wording "inclined geostationary satellite" should read "inclined geosynchronous satellite".

23) Column 3, Line 49 – the wording "inclined geostationary satellite" should read "inclined geosynchronous satellite".

24) Column 4, Line 5 – the wording "inclined-orbit" should read "inclined geosynchronous".

25) Column 4, Line 9 – the wording "inclined-orbit" should read "inclined geosynchronous".

26) Column 4, Line 12 – the wording "inclined orbit" should read "inclined geosynchronous".

27) Column 4, Line 23 – the wording "inclined geostationary satellite" should read "inclined geosynchronous satellite".

28) Column 4, Line 61 – the wording "inclined geostationary satellite" should read "inclined geosynchronous satellite".

29) Column 4, Line 64 – the wording "inclined geostationary satellite" should read "inclined geosynchronous satellite".

30) Column 5, Line 4 – the wording "inclined geostationary satellite" should read "inclined geosynchronous satellite".

31) Column 5, Line 52 – the wording "geostationary satellite" should read "geosynchronous satellite".

32) Column 5, Line 59 – the wording "geostationary satellite" should read "geosynchronous satellite".

33) Column 5, Line 61 – the wording "geostationary satellite" should read "geosynchronous satellite".

34) Column 6, Line 25 – the wording "inclined geostationary satellite" should read "inclined geosynchronous satellite".

35) Column 7, Line 3 – the wording "inclined geostationary satellite" should read "inclined geosynchronous satellite".

36) Column 7, Line 4 – the wording "inclined geostationary satellite" should read "inclined geosynchronous satellite".

37) Column 7, Line 33 – the wording "inclined geostationary satellite" should read "inclined geosynchronous satellite".

CERTIFICATE OF CORRECTION (continued)
U.S. Pat. No. 10,830,900 B1

38) Column 7, Line 55 – the wording "inclined geostationary satellite" should read "inclined geosynchronous satellite".

39) Column 7, Line 57 – the wording "inclined geostationary satellite" should read "inclined geosynchronous satellite".

40) Column 7, Line 61 – the wording "inclined geostationary satellite" should read "inclined geosynchronous satellite".

41) Column 7, Line 66 – the wording "inclined geostationary satellite" should read "inclined geosynchronous satellite".

42) Column 7, Line 67 – the wording "inclined geostationary satellite" should read "inclined geosynchronous satellite".

43) Column 8, Line 2 – the wording "inclined geo-stationary satellites" should read "inclined geosynchronous satellites".

44) Column 8, Line 14 – the wording "GEO satellite" should read "geosynchronous satellite".

45) Column 9, Line 20 – the wording "inclined geostationary satellite" should read "inclined geosynchronous satellite".

In the Claims

46) Column 10, Line 32 – the wording "inclined geostationary satellite" should read "inclined geosynchronous satellite".

47) Column 10, Line 34 – the wording "inclined geostationary satellite" should read "inclined geosynchronous satellite".

48) Column 10, Line 43 – the wording "inclined geostationary satellite" should read "inclined geosynchronous satellite".

49) Column 10, Line 45 – the wording "inclined geostationary satellite" should read "inclined geosynchronous satellite".

50) Column 11, Line 3 – the wording "inclined geostationary satellite" should read "inclined geosynchronous satellite".

51) Column 11, Line 4 – the wording "inclined geostationary satellite" should read "inclined geosynchronous satellite".

52) Column 11, Line 13 – the wording "inclined geostationary satellite" should read "inclined geosynchronous satellite".

CERTIFICATE OF CORRECTION (continued)
U.S. Pat. No. 10,830,900 B1

53) Column 11, Line 24 – the wording "inclined geostationary satellite" should read "inclined geosynchronous satellite".

54) Column 11, Line 33 – the wording "inclined geostationary satellite" should read "inclined geosynchronous satellite".

55) Column 11, Line 35 – the wording "inclined geostationary satellite" should read "inclined geosynchronous satellite".

56) Column 12, Line 22 – the wording "inclined geostationary satellite" should read "inclined geosynchronous satellite".

57) Column 12, Line 24 – the wording "inclined geostationary satellite" should read "inclined geosynchronous satellite".

58) Column 12, Line 34 – the wording "inclined geostationary satellite" should read "inclined geosynchronous satellite".

59) Column 12, Line 36 – the wording "inclined geostationary satellite" should read "inclined geosynchronous satellite".

60) Column 12, Line 38 – the wording "inclined geostationary satellite" should read "inclined geosynchronous satellite".

61) Column 12, Line 43 – the wording "inclined geostationary satellite" should read "inclined geosynchronous satellite".